(No Model.) 2 Sheets—Sheet 1.
E. G. SHORTT.
ENGINEER'S VALVE FOR AUTOMATIC BRAKE MECHANISM.
No. 466,433. Patented Jan. 5, 1892.
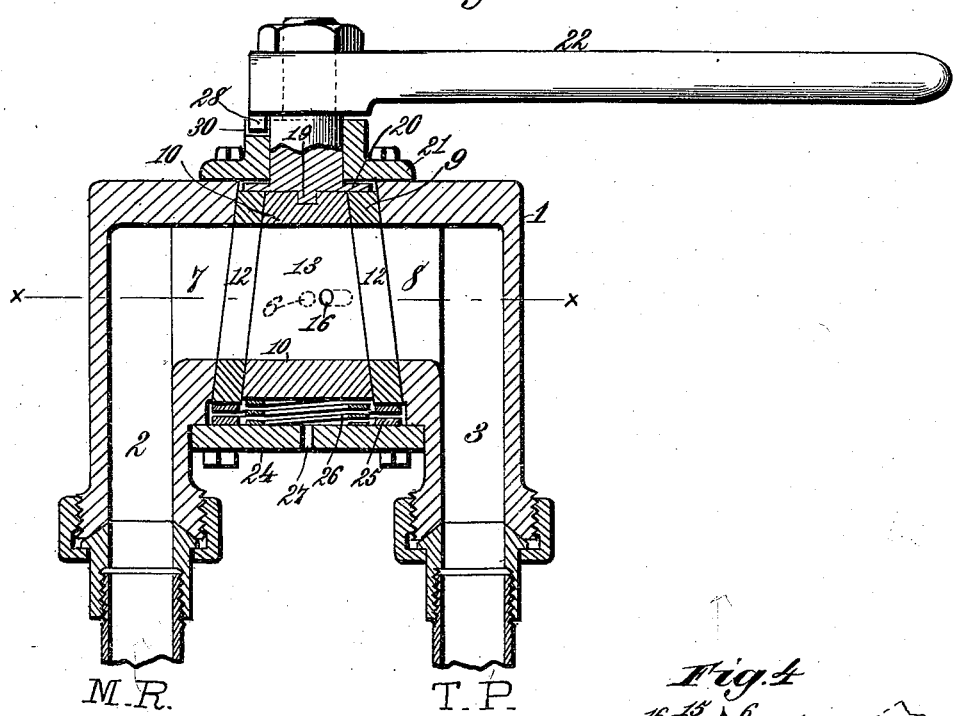
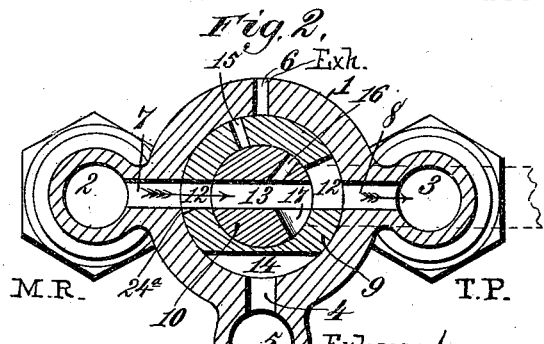
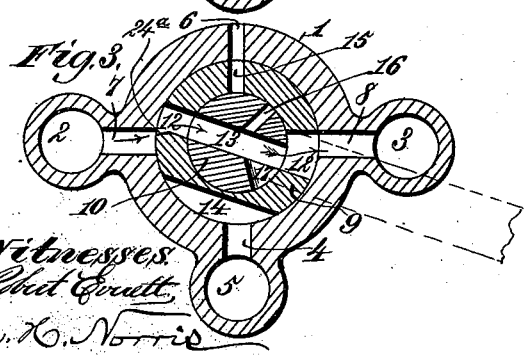
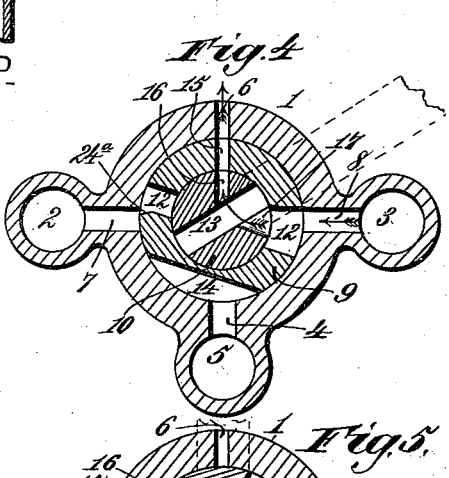
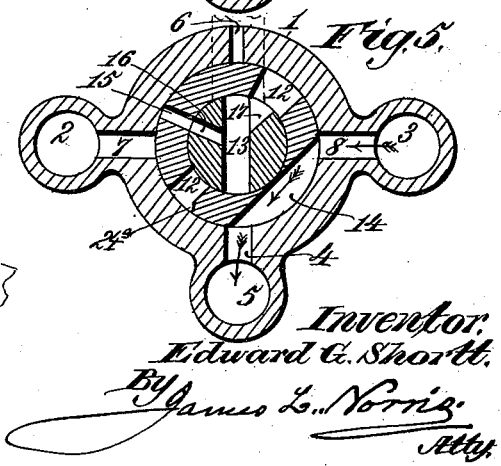
Witnesses
Robert Pratt
A. H. Norris
Inventor:
Edward G. Shortt
By James L. Norris
Atty.

(No Model.) 2 Sheets—Sheet 2.
E. G. SHORTT.
ENGINEER'S VALVE FOR AUTOMATIC BRAKE MECHANISM.
No. 466,433. Patented Jan. 5, 1892.
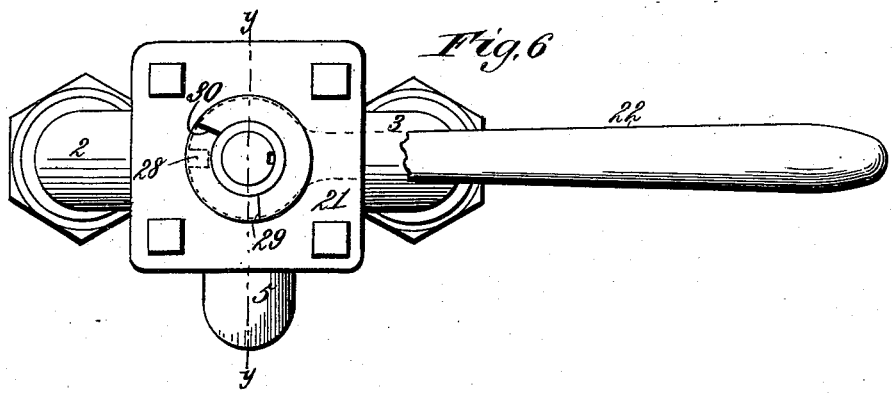
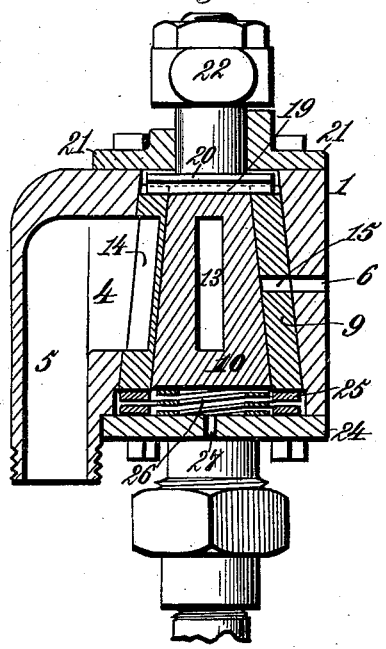
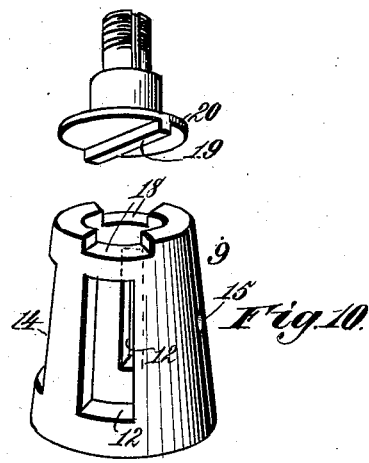
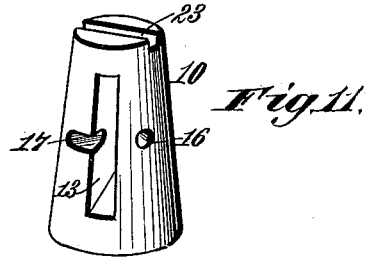
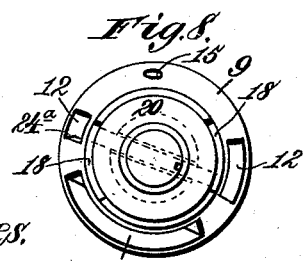
Witnesses:
Robert Everett
A. H. Norris
Inventor:
Edward G. Shortt,
By James L. Norris
Atty.
THE NORRIS PETERS CO., PHOTO-LITHO., WASHINGTON, D. C.

UNITED STATES PATENT OFFICE.

EDWARD G. SHORTT, OF CARTHAGE, ASSIGNOR TO CHARLES G. EMERY, TRUSTEE, OF BROOKLYN, NEW YORK.

ENGINEER'S VALVE FOR AUTOMATIC BRAKE MECHANISMS.

SPECIFICATION forming part of Letters Patent No. 466,433, dated January 5, 1892.

Application filed March 30, 1891. Serial No. 387,012. (No model.)

*To all whom it may concern:*

Be it known that I, EDWARD G. SHORTT, a citizen of the United States, residing at Carthage, in the county of Jefferson and State of New York, have invented new and useful Improvements in Engineer's Valve for Automatic Brake Mechanisms, of which the following is a specification.

This invention relates to the valve operated by the engineer on the locomotive for the purpose of controlling the fluid-pressure of an automatic brake mechanism, particularly that type or class wherein a piston has an equal fluid-pressure on both sides while the brakes are released or off, whereby the brakes are applied and released by relieving and restoring the pressure at one side of the piston.

The objects of my invention are to improve the prior valves of this character and to provide a novel engineer's or locomotive valve for applying the brakes gradually or suddenly which avoids the necessity of expertness in working the valve for the gradual application of the brakes. These objects are accomplished by the features of construction and the combination or arrangement of devices hereinafter described and claimed, reference being made to the accompanying drawings, in which—

Figure 1 is a vertical central sectional view, partly in elevation, of a valve embodying my invention. Fig. 2 is a horizontal sectional view taken on the line *x x*, Fig. 1, with the valve adjusted to admit air from the compressed-air reservoir to the train-pipe. Fig. 3 is a similar view showing the valve closed to maintain the fluid-pressure in the train-pipe and brake-cylinders. Fig. 4 is a similar view showing the valve adjusted for the slow release of the fluid-pressure and the gradual application of the brakes. Fig. 5 is a similar view showing the valve adjusted for the rapid release of the fluid-pressure and the sudden application of the brakes. Fig. 6 is a top plan view of the valve mechanism. Fig. 7 is a vertical central sectional view taken on the line *y y*, Fig. 6. Fig. 8 is a detail top plan view of the valve-plugs. Fig. 9 is a detail perspective view of the device by which the two plugs are oscillated or turned. Fig. 10 is a detail perspective view of the exterior valve-plug, and Fig. 11 is a detail perspective view of the interior valve-plug.

In order to enable those skilled in the art to make and use my invention, I will now describe the same in detail, referring to the drawings, wherein—

The numeral 1 indicates the casing of an engineer's or locomotive valve for controlling the fluid-pressure of an automatic brake mechanism for railway-cars. The valve-casing is constructed with a central conical valve-plug chamber, a pair of oppositely-arranged parallel passages 2 and 3 for connecting, respectively, with the main compressed-air reservoir on the locomotive and the train-pipe, a port 4 leading to the outlet 5, which communicates with the external atmosphere, and a port 6 of reduced capacity which also communicates with the external atmosphere. The ports 4 and 6 are respectively for the escape of the fluid-pressure for the sudden or gradual application of the brakes, it being obvious that the port 4 of greater capacity will permit the more rapid release of the fluid-pressure than the port 6 of reduced capacity. The parallel passages 2 and 3 are adapted to communicate at the upper end by means of transverse channels 7 and 8, governed by the duplex-valve plug, which I will now proceed to explain.

The conical valve-chamber of the valve-casing has its smallest end arranged at the upper portion thereof, and the seat of this valve-chamber is accurately turned to fit the face of an exterior conical valve-plug 9, within which is arranged to axially turn a smaller conical valve-plug 10. The two valve-plugs are coextensive in length and are provided, respectively, with transverse rectilinear channels 12 and 13, adapted to be placed in coincidence with each other and with the channels 7 and 8, for the purpose of permitting the compressed air from the main air-reservoir to pass through the passage 2 to the passage 3, which connects with the train-pipe.

I prefer to employ my present invention in connection with the brake mechanism described and shown by my application for Letters Patent filed of even date herewith, Serial No. 387,011; but I do not wish to be understood as confining myself to any particular construction of brake cylinder and connections.

The exterior valve-plug 9 is cut away at one side to form a cavity 14, and opposite this cavity the plug is provided with a port 15 of a diameter coequal with the port 6 in the valve-casing. The interior plug 10 is provided with a port 16 of reduced diameter, which communicates with the transverse channel 13, and is adapted to be placed into coincidence with the ports 15 and 6 for the purpose of permitting the slow release of the fluid-pressure in the train-pipe. The side wall of the channel 13, opposite the port 16, is cut away to form what may be termed a "notch" 17, Fig. 11, which is adapted to register with the channel 8 when the ports 15 and 6 are in coincidence for the slow release of the fluid-pressure, as in Fig. 4, in which position the channel 13 of the interior valve-plug will be closed.

The upper end of the exterior valve-plug 9 is formed with a pair of segmental recesses 18, in which is adapted to play the rectilinear rib 19, formed on the under side of the disk 20, journaled in the detachable cap 21 of the valve-casing 1 and connected at its outer end with the handle or lever 22. The upper end of the exterior valve-plug is provided with a rectilinear transverse groove 23, with which engages the rib 19, so that when the disk 20 is turned through the medium of the handle or lever 22 the interior valve-plug is correspondingly turned. By means of the segmental recesses 18 it will be obvious that the interior valve-plug can be turned to a limited extent independent of any turning movement of the exterior valve-plug, such independent movement being limited by the length of the segmental recesses 18, the end walls or edges of which constitute abutments against which the rib 19 operates for the purpose of turning the exterior and interior plugs in unison, as hereinafter explained.

In Fig. 2 the parts are adjusted into position for the free passage of air or other fluid from the main compressed-air reservoir into the train-pipe, and in Fig. 3 the valve-plugs are adjusted to maintain the fluid-pressure in the train-pipe, while at the same time permitting a small quantity of air to flow through the valve into the train-pipe to compensate for leakage and maintain reservoir-pressure. This is accomplished by slightly beveling the diagonal opposite edges of the channels 12 in the exterior valve-plug, as at 24$^a$, Fig. 3. A plate 24 is bolted to the under side of the valve-casing, and between this plate and the lower end of the exterior valve-plug 9 is arranged a helical spring 25, while a helical spring 26 of less power is similarly arranged to act upon the interior valve-plug. These springs exert pressure on the valve-plugs, and since the springs are of different power it requires greater force to turn the exterior valve-plug than to turn the interior valve-plug. The plate 24 is shown as provided with an orifice 27 for the escape of air that might otherwise accumulate beneath the valve-plugs and interfere with their convenient operation. If the fluid-pressure be held in the train-pipe and it is desired to gradually apply the brakes, as when stopping at a station, the engineer swings the handle or lever to turn the interior valve-plug from the position shown in Fig. 3 until the rib 19 of the disk 20 bears against the diagonally-opposite ends of the segmental recesses 18, at which instant the port 16 is registered with the port 15, and the latter is in coincidence with the gradual-relief port 6, as in Fig. 4, whereupon the fluid-pressure will escape for the gradual application of the brakes. The instant the valve-plugs are in position, as shown in Fig. 4, for the gradual application of the brakes the engineer is made aware of the fact by what may be described as the sense of touch, in that the rib 19 is brought against diagonally-opposite ends of the segmental recesses 18, and since greater power is required to turn the exterior valve-plug 9 than to turn the interior valve-plug 10, by reason of the power of the spring 25, the engineer can accurately determine by the sensible faculty the instant the ports are in position for the gradual or slow release of the fluid-pressure, and, therefore, the engineer can determine that further turning movement of the handle or lever 22 will place the ports in position (shown in Fig. 5) for the quick release of the fluid-pressure to apply the brakes suddenly. By this means there is no liability of turning the valve-plugs to such extent as to inadvertently effect the rapid release of the fluid-pressure and the consequent sudden application of the brakes. The sensibility of touch thus enables the engineer to accurately work the valve without expertness. If it be desired to rapidly release the fluid-pressure for applying the brakes suddenly in the case of an emergency or immediate danger, the lever is moved to turn the two valve-plugs in unison until the stop-lug 28 on the handle or lever strikes the top 29 on the cap-piece 21, Fig. 6, of the valve-casing, when the cavity 14 of the exterior valve-plug will be placed in communication with the enlarged channels 8 and 4, as in Fig. 5, and consequently the fluid will rapidly escape through the outlet 5' to the external atmosphere. If the handle or lever be turned back until the stop-lug 28 bears against the stop 30, Fig. 6, the valve-plugs will be placed in the position shown in Fig. 3 to hold the fluid-pressure and maintain the reservoir-pressure in the train-pipe.

It will be obvious that the release of the fluid-pressure through the port 6 can be varied by placing a greater or less portion of the port 16 in communication with the ports 15 and 6. The normal position of the valve-plugs, when the fluid-pressure is maintained in the train-pipe, is indicated in Fig. 3, from which it will be observed that the slow-release port 15 of the exterior valve-plug 9 connects with the release-port 6 of the valve-casing, and therefore it is only necessary to turn the interior valve-plug alone, as before explained, to release the pressure for the gradual application of the brakes.

Having thus described my invention, what I claim is—

1. The combination, with a valve-casing having passages for connecting with the main reservoir and train-pipe of a brake system, of a pair of valve-plugs provided with ports and one turning within the other and connected together, so that the inner plug can turn independently of the outer plug to a limited extent for the gradual application of the brakes and then both plugs turned simultaneously for the sudden application of the brakes, substantially as described.

2. The combination, with a valve-casing having passages to connect with the main reservoir and train-pipe of a brake system, of a pair of rotating valve-plugs, one turning within the other, means for turning the interior valve-plug independently of the exterior valve-plug and subsequently turning both in unison, and two springs of different power acting respectively upon the interior and exterior valve-plugs, substantially as described.

3. The combination, with a valve-casing having passages to communicate with the main reservoir and train-pipe of a brake system and provided with two fluid-outlets of different capacity, of the rotating plug 9, having opposite transverse channels 12, quick-release cavity 14, and slow-release port 15, the interior valve-plug having the transverse channel 13 and slow-release port 16 and notch 17, and means for turning the interior valve-plug independently of the exterior valve-plug and subsequently turning both in unison, substantially as described.

4. The combination, with a valve-casing having passages to communicate with the reservoir and train-pipe of a brake system, of a pair of conical valve-plugs provided with ports and one turning within the other, the outer valve-plug having at one end segmental recesses and the inner valve-plug having a transverse groove, and the handle or lever having an attached disk or plate provided with a rib engaging the groove and working in the segmental recesses, substantially as described.

In testimony whereof I have hereunto set my hand and affixed my seal in presence of two subscribing witnesses.

EDWARD G. SHORTT. [L. S.]

Witnesses:
 ALBERT H. NORRIS,
 JAMES A. RUTHERFORD.